Nov. 12, 1929.  L. G. McCLINTOCK  1,735,289
RADIATOR CONNECTION FOR TRANSFORMER TANKS
Filed March 1, 1924
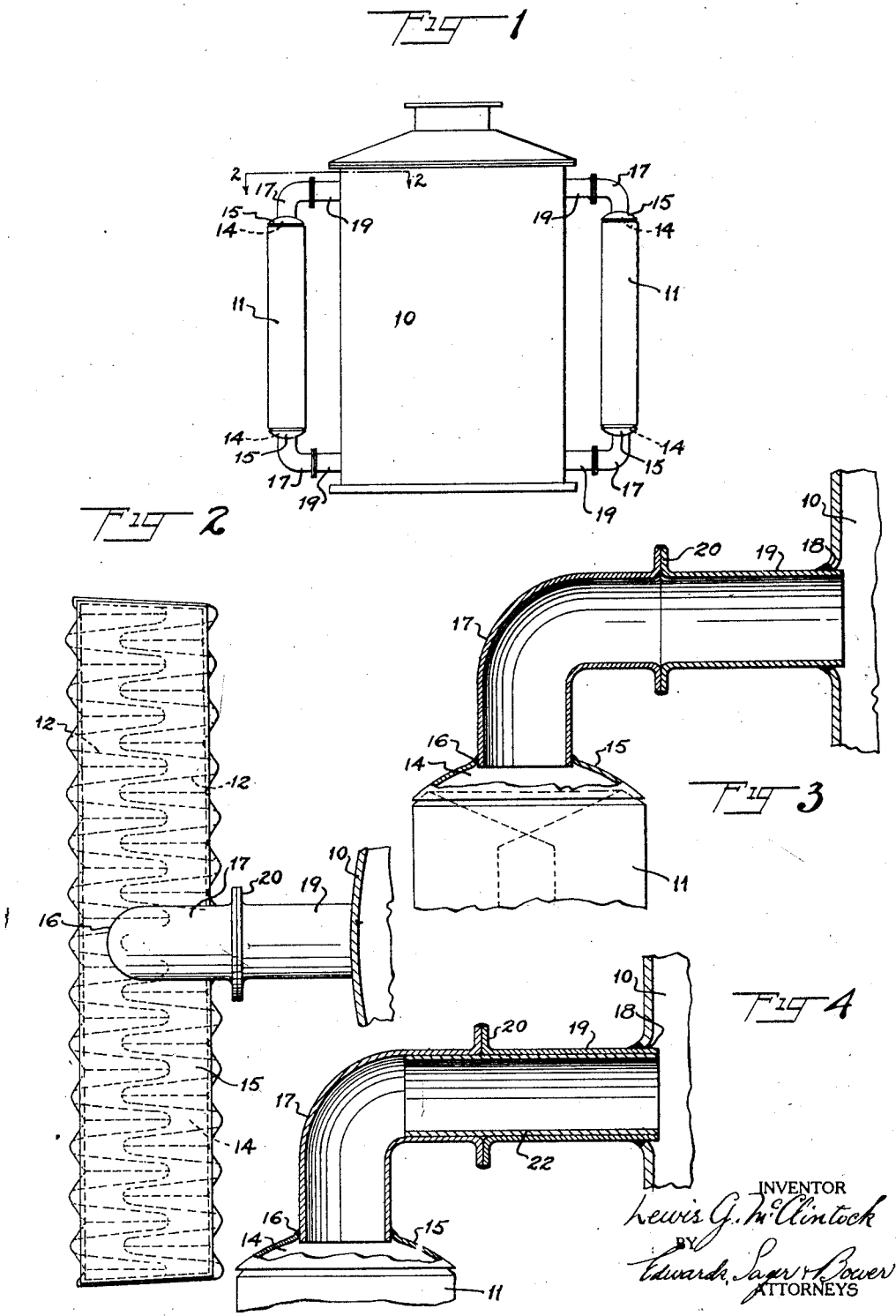

Patented Nov. 12, 1929

1,735,289

UNITED STATES PATENT OFFICE

LEWIS G. McCLINTOCK, OF PITTSBURGH, PENNSYLVANIA, ASSIGNOR TO PITTSBURGH TRANSFORMER COMPANY, A CORPORATION OF PENNSYLVANIA

RADIATOR CONNECTION FOR TRANSFORMER TANKS

Application filed March 1, 1924. Serial No. 696,167.

This invention relates to means for attaching a radiator to a transformer tank and has for its object to provide an improved means of this character, and also to provide an improved method of attaching the radiator to the tank.

The advantages of my invention will appear from the following description taken in connection with the accompanying drawings wherein Fig. 1 is a diagrammatic elevation of a transformer tank, radiators and radiator attaching means embodying one form of my invention.

Fig. 2 is an enlarged fragmentary sectional view taken on the line 2—2 of Fig. 1 looking in the direction of the arrows.

Fig. 3 is an enlarged detail view partly in section showing the connecting means between the tank and radiator.

Fig. 4 is a view similar to Fig. 3 but showing a tube in the connecting pipe sections which may be employed to support the radiator at the time these sections are welded together.

In the drawing 10 represents a tank or other receptacle adapted to contain a transformer or other suitable device and adapted also to contain oil or other suitable cooling and insulating fluid in which the transformer is immersed. 11 represents radiators through which the cooling oil is adapted to circulate. These radiators as shown in Fig. 2 comprise oppositely disposed corrugated sides 12 between which oil passes in the form of a thin corrugated film. Communicating with the space between the corrugations and inside the radiator are spaces 14 which lie above and below the ends of the corrugations as shown more clearly in Figs. 1 and 3. These spaces are formed in part by angular metal members 15 which are formed with openings 16 for the reception of elbows 17 welded, brazed or otherwise suitably secured to the edges of the openings 16. The tank 10 is formed with an upper and lower series of openings 18 to the edges of which are welded or otherwise suitably secured pipe sections 19. The elbow sections 17 and pipe sections 19 are each formed at their outer ends with flanges 20 which lie in contact with one another and are welded or brazed together at their outer edges.

In practice during the operation of welding the sections together, a tube 22 may be inserted in the pipe sections so as to maintain them in alignment and support the radiator during the welding operation. If desired this inner pipe section may be removed after the radiator has been attached or may be left in the position shown in Fig. 4 in which cases it will serve to strengthen the supporting pipe sections.

In accordance with the invention above described the radiators may be quickly and easily attached to the tank and the joints formed will be strong and oil tight. The pipe sections need not be machined to secure a firm contact between the flanges because these flanges which are somewhat flexible may be readily clamped together at the time the welding operation is performed.

It will be understood that other suitable type of radiator may be employed in place of the type specifically shown.

I claim:

1. A tank, a radiator, and means for attaching the radiator to the tank and supporting the same therefrom comprising pipe sections formed with substantially radial, unmachined flanges whose faces contact with one another and which are welded together at their edges, and means whereby bending stress on the joint so formed tending to be localized in said weld at the outside of the bend is distributed into other portions of said weld to thereby strengthen said joint.

2. The combination comprising a tank, a radiator disposed substantially parallel to said tank and means for connecting said tank and radiator at spaced points, comprising horizontal pipe sections extending from said tank and radiator and having outwardly extending flanges at their adjacent ends and a pipe having telescopic relation within each of said pipes, whereby the vertical load of said radiator is carried by said inserted pipe and the outer edges of said flanges being welded to form a leakproof joint but being free of the vertical radiator load.

3. A tank, a radiator, means for attaching the radiator to the tank comprising pipe sections formed with flexible flanges whose faces contact with one another, and means for fastening said flanges to each other at their edges, said flanges, under stress tending to bend said attaching means, being flexed to the greatest extent at the points of substantially greatest stress.

LEWIS G. McCLINTOCK.